D. H. BUCKLEY.
STEERING DEVICE FOR AUTOMOBILES.
APPLICATION FILED OCT. 2, 1914.
1,139,453.
Patented May 11, 1915.
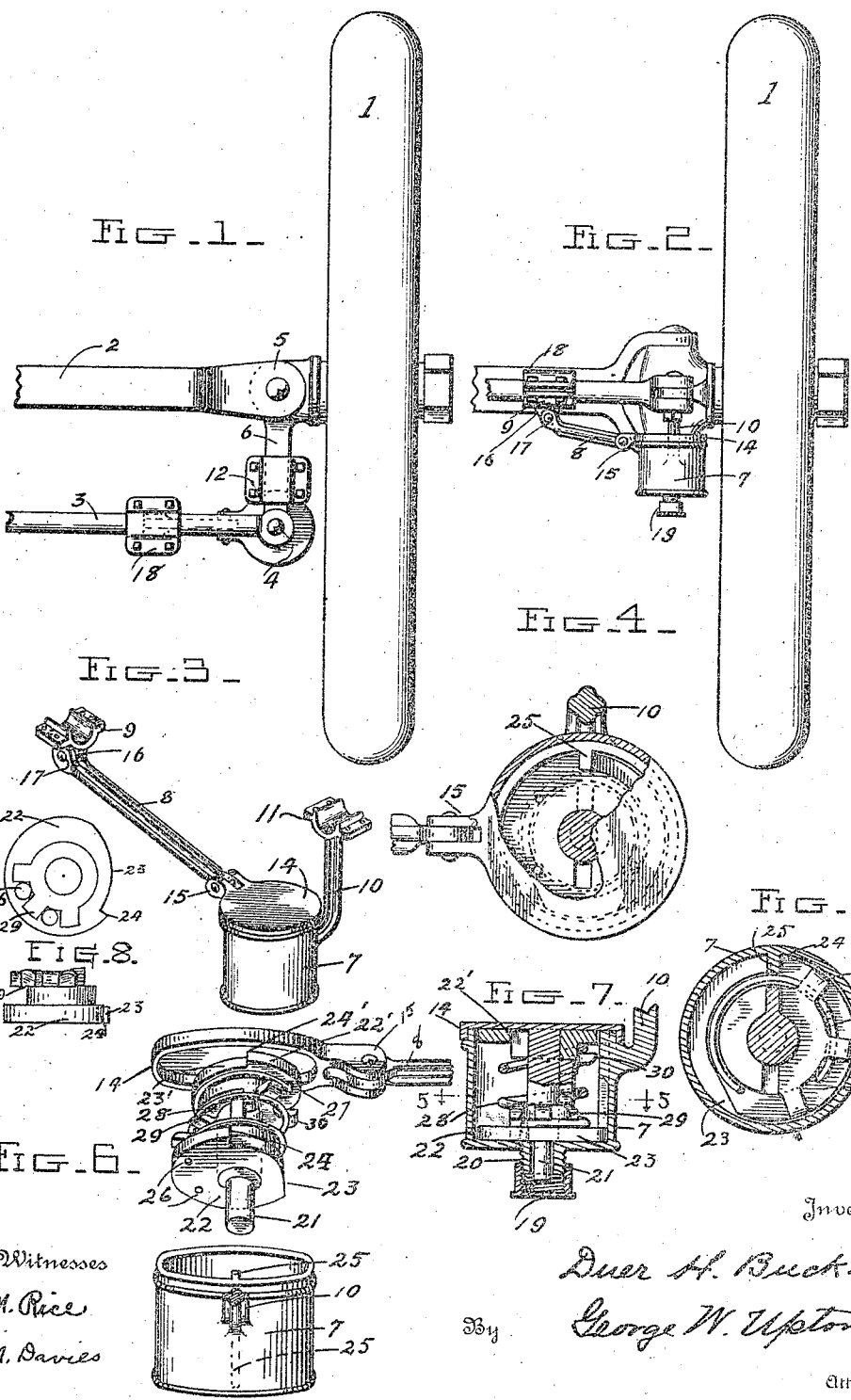

UNITED STATES PATENT OFFICE.

DUER H. BUCKLEY, OF VIENNA, OHIO, ASSIGNOR OF ONE-HALF TO JOHN E. SEARLES, OF CHICAGO, ILLINOIS.

STEERING DEVICE FOR AUTOMOBILES.

1,139,453.  Specification of Letters Patent.  Patented May 11, 1915.

Application filed October 2, 1914. Serial No. 364,616.

*To all whom it may concern:*

Be it known that I, DUER H. BUCKLEY, a citizen of the United States of America, residing at Vienna, in the county of Trumbull and State of Ohio, have invented certain new and useful Improvements in Steering Devices for Automobiles, of which the following is a specification.

My invention relates to improvements in steering devices for automobiles and has for its objects: first, to provide automatic mechanism for holding the front wheels normally in line with the body of the vehicle; second, to overcome the tendency of the front wheels and axle to swerve to one side or the other and ditch the car in the event of loss of control by or accident to the chauffeur; third, to provide automatic means for keeping an automobile in the road where curves thereof are not abnormally short, and fourth to render the steering of an automobile easier for the chauffeur, giving him more use of his hands and at the same time to afford a yielding semi-control which, though strong and in a measure stiff, shall not operate as a rigid locking device or require manipulation to overcome its normal operation.

I attain those objects by the mechanism illustrated in the accompanying drawings, in which—

Figure 1 is a plan view of the right hand front wheel of an automobile with my attachment secured to the steering rods. Fig. 2 is a rear view of the same. Fig. 3 is a perspective view of my device detached. Fig. 4 is a plan view of the device partly in section. Fig. 5 is a sectional view on line 5—5 of Fig. 7. Fig. 6 is a perspective view with the mechanism removed from the housing. Fig. 7 is a vertical section with parts in full lines. Fig. 8 is a plan view of the plate 22 of Figs. 6 and 7, and an elevation thereof.

Similar characters refer to like parts throughout the several views.

I have illustrated only one wheel, 1, part of the front axle 2 and a part of the steering rod, 3, (broken away), of an automobile, for those skilled in the art know the relative construction of axles and chassis and that the steering rod 3 extends across the front of the car ordinarily to the rear of the front axle 2 and is pivotally attached thereto at both ends as by pivots, 4 and 5 and lever arms 6, at either end, one only being shown, so that the operation of one end of the steering rod 3 by the manipulation of the steering wheel (not shown) by the chauffeur, effects like changes of direction of the two forward wheels.

Referring to Fig. 3, I provide a housing 7 having a rigid arm 10 attached thereto or made a part thereof and of such shape and form as to position the housing 7 at an operable location relative to the axle of the vehicle as the type of automobile may require. I have shown the arm 10 as extending horizontally forward and thence at a right angle upward so that a bolt plate 11 seated under arm 6 and clamped thereto by a corresponding upper bolt plate 12, (Fig. 1), will locate the housing 7 directly under the pivot 4.

A removable top or cap, 14, (see Figs. 3 and 6) is provided for the housing 7, and to it is attached an arm 8, (preferably pivotally as by pivot 15 in order to allow for eccentric movements of the rod 3, due to irregularities in the road). I have also shown a supporting arm 16 rocking on a pivot 17, for the same reason, and bearing a similar bolt plate 9 which when used with bolt plate 18, (Fig. 1) clasps the rod 3 and in its normal position holds the arm 8 parallel to the axle 2 and at right angles to the arm 10.

19 represents an oil cup and serves also to keep dust and dirt out of the housing 7, and may be threaded onto a hollow projection 20. The projection 20 also serves as a seat for a peg, 21, (Figs. 6 and 7) protruding through a plate 22 which would be a circular disk but that I cut out a segment, 23, so as to leave a shoulder 24 to lock against one side of an interior lug 25, which extends vertically from the top to the bottom of the interior wall of the housing 7 of which it is cast as a part and which serves to limit the rotative movement of the plate 22, at its lower end, by abutment against the shoulder 24, when the rotation would be in one direction; and said lug 25, at its top, limits the rotation, in the opposite direction, of the plate 22′ by abutment of the shoulder 24′, made by cutting out the segment 23′, of said plate 22′, which, in practice, though illustrated as a separate piece in Fig. 6, for clarity, I cast as a part of the movable cap 14 of the housing 7; and make the peg 21 as a solid extension thereof, rigid as to the cap 14 and rotating loosely through the lower plate 22 and pivoted in hollow projection 20 which acts as a bearing for it.

Through the lower plate 22 I pierce a plurality of holes 26, 26 (Fig. 6) and corresponding holes 27, oppositely disposed to holes 26, in the upper plate 22'.

The ends of a spiral spring 28 which surrounds the peg 21 between the plates 22 and 22', are bent slightly and inserted respectively in a pair of the holes 26 and 27, to hold the spring in locked relation both to the revolving housing cap 14 at the spring's top and to the loose plate 22 seated in the housing 7 near its bottom and rotative about peg 21.

As the shoulder 24 is on one side of the lug 25 and locks against the lug 25 of the housing which co-acts with the arm 10, and as the shoulder 24' locks against the other side of the lug 25 and co-acts with the cap 14 and the arm 8, it is easy to understand that the normal tendency of the stiff spring 28 will be to hold the arms 10 and 8 at right angles to each other and keep the front wheels of the automobile directed forwardly and in longitudinal line with its body and in the road, if reasonably straight, throwing them back instantly to that position if they are jolted to one side or the other as by stones or ruts, or in case the chauffeur releases the steering wheel.

Merely to provide means for increasing or decreasing the operative strength of the spring 28 I provide the additional holes 26 and 27 referred to and provide a corresponding plurality of lugs 29, 29 on the plate 22 and 30, 30 on the plate 22', between which the respective bent ends of the spring 28 can be passed, into and through the corresponding holes 26, 26 and 27, 27 as occasion may require, said lugs being for no other purpose and not absolutely necessary because, ordinarily, the spring 28, having been once adjusted and positioned it does not become necessary to change it.

I claim:

1. In a device of the kind described, a housing adapted for attachment to one arm of a steering rod for vehicles: a rotatable cap for said housing having an arm adapted for attachment to the other arm of said rod at a right angle to said first arm, and spring actuated restraining mechanism in said housing.

2. In combination with a steering rod for automobiles comprising a horizontal rod (3) parallel to the axle (2) of the machine, and pivoted longitudinal arms (6) at its extremities, a housing (7) having a rigid arm (10) clamped to one of said longitudinal arms and having a loose cap (14) pivotally attached to said horizontal rod by a movable arm (8); a centrally disposed peg (21) attached to said cap and rotatively journaled in said housing: a spiral spring surrounding said peg: adjustable means for attaching one end of said spring to said cap: a loose plate (22) pierced by said peg: adjustable means for attaching the other end of said spring thereto, and means for limiting the rotative movement of said housing and said plate therein, for the purpose set forth.

In testimony whereof I affix my signature in presence of two witnesses.

DUER H. BUCKLEY.

Witnesses:
F. W. SERLS,
M. G. SULLIVAN.